(12) United States Patent
Dusing et al.

(10) Patent No.: US 10,378,989 B2
(45) Date of Patent: Aug. 13, 2019

(54) METHOD FOR PRODUCING A SENSOR ELEMENT BY MEANS OF LASER STRUCTURING

(71) Applicant: Trafag AG, Bubikon (CH)

(72) Inventors: Jan Dusing, Hannover (DE); Jurgen Koch, Hannover (DE); Oliver Suttmann, Hannover (DE); Marc Broetzmann, Villingen-Schwenningen (DE); Armin Siber, Radolfzell (DE); Dieter Zeisel, Forch (CH)

(73) Assignee: Trafag AG, Bubikon (CH)

( * ) Notice: Subject to any disclaimer, the term of this patent is extended or adjusted under 35 U.S.C. 154(b) by 0 days.

(21) Appl. No.: 15/591,656

(22) Filed: May 10, 2017

(65) Prior Publication Data
US 2017/0370796 A1 Dec. 28, 2017

(30) Foreign Application Priority Data

May 13, 2016 (DE) .................. 10 2016 108 985

(51) Int. Cl.
*G01L 1/18* (2006.01)
*G01L 9/00* (2006.01)
*G01L 23/18* (2006.01)
*G01P 15/12* (2006.01)

(52) U.S. Cl.
CPC ............... *G01L 23/18* (2013.01); *G01L 1/18* (2013.01); *G01L 9/0002* (2013.01); *G01L 9/0052* (2013.01); *G01P 15/123* (2013.01)

(58) Field of Classification Search
CPC ....................................................... G01L 23/18
See application file for complete search history.

(56) References Cited

U.S. PATENT DOCUMENTS

| 2006/0118233 A1* | 6/2006 | Wargo ................. H05K 3/1258 156/247 |
| 2015/0056742 A1* | 2/2015 | Rana ................. H01L 31/02167 438/71 |

OTHER PUBLICATIONS

"Ultrafast Laser Patterning of Thin Films on 3-D Shaped Surfaces for Strain Sensor Applications" by Duesing et al., (Journal of Laser Micro/ Nanoengineering. Nov. 2012, vol. 7 Issue 3, p. 311-315) (Year: 2012).*

* cited by examiner

*Primary Examiner* — Ryan D Walsh
(74) *Attorney, Agent, or Firm* — Mintz Levin Cohn Ferris Glovsky and Popeo, P.C.; Kongsik Kim; Jhongwoo Jay Peck (57) ABSTRACT

In order to produce accurate sensor element in a simple way, the invention provides a method for producing a sensor element (10) for a pressure or force sensor. Steps include, providing a component (13) to be deformed. Applying to the component (13), a sensor function and contact layer (24) consisting of a material with a k-factor between 2 and 10. Performing planar ablation of the material of the sensor function and contact layer (24) by means of a laser, in such a manner that strain gauges (44) with a resistance structure with a meandering shape and contact pads (46.1, 46.2, 46.3, 46.4) remain standing.

14 Claims, 6 Drawing Sheets

METHOD FOR PRODUCING A SENSOR ELEMENT BY MEANS OF LASER STRUCTURING

The invention relates to a method for producing a sensor element for a pressure sensor or force sensor. Furthermore, the invention relates to a sensor element that can be obtained by such a method and to a sensor equipped with it.

Force sensors and pressure sensors, their structure and their typical uses are known, for example, from DE 101 31 688 B4, DE 10 2004 024 919 A1, DE 10 2004 024 920 B4, DE 10 2004 063 598 A1, DE 10 2005 012 686 A1, DE 10 2006 023 724 B4, DE 10 2006 033 266 B4, DE 10 2009 024 576 B4, DE 10 2009 030 702 A1, DE 10 2012 100 942 A1 and DE 10 2013 114 728 A1, as well as from DE 102 11 992 C2 and EP 2 446 239 B1.

In sensors of the above-mentioned prior art, strain gauges are frequently used for measuring deformation on the surface of components. These deformations can be of the expansive or compressive type. Strain gauges are based on a structured functional layer, which is applied by thin-film or thick-film technology to an expandable substrate of silicon, ceramics or metal frequently coated with an insulator. A medium under pressure causes a deflection of the membrane and thus an expansion of the membrane surface, which is typically covered with a functional layer and contains the strain gauges, which are at times applied in a meandering shape. It is known to structure four such resistances as a sheet resistance and to configure them in accordance with a measuring bridge, i.e. in particular with a Wheatstone bridge circuit. The structuring of the meanders may typically be produced by means of photolithographic, wet-chemical methods.

From the aforementioned prior art, thin-film pressure sensors are known whose sensor elements are fabricated from a substrate that was fabricated from a high-strength steel alloy (e.g. DIN material 1.4542 or Inconel) and has a reversibly deformable metal membrane. Preferred exemplary embodiments of the present invention are also preferably based upon such a substrate and a membrane produced with it.

The insulation layers and the functional layers can be applied using common semiconductor processes, such as PVD (physical vapor deposition) or CVD (chemical vapor deposition). The insulation layer frequently is a glass layer SiOxNy, the functional layer typically consists of Nichrome (NiCr) or also titanium oxynitride (TiON, known, e.g., from DE 3522427 C2).

Finally, an additional contact layer, frequently consisting of nickel, is also applied, which enables the electrical connection with the electronics. Usually, wire-bonding techniques are used in this case, in addition to soldering techniques.

In the strain gauges, the change of the shape of the carrier (i.e. particularly of the membrane in this case, that is, in particular expansion/compression) is transmitted to the strain gauge. A change in resistance occurs in the strain gauge. The strain gauge has a so-called "k-factor", which indicates the proportionality of the change in resistance $\Delta R$ to the expansion $\varepsilon$, as is explained below.

The resistance of the unstressed strain gauge is:

$$R = \rho \frac{l}{A} = \rho \frac{4 \cdot l}{D^2 \cdot \pi}$$

The individual symbols represent the following quantities:
ρ: resistivity
l: wire length
A: cross-sectional area
D: diameter of the wire Generally, the change in resistance under stress is:

$$\Delta R = \frac{\partial R}{\partial \rho} \cdot \Delta \rho + \frac{\partial R}{\partial l} \cdot \Delta l + \frac{\partial R}{\partial D} \cdot \Delta D$$

The relative change in resistance is obtained by differentiating and rearranging:

$$\frac{\Delta R}{R} = \frac{\Delta \rho}{\rho} + \frac{\Delta l}{l} - \frac{2 \cdot \Delta D}{D}$$

The relative change in resistance is dependent upon the longitudinal and transversal expansion.

$$\varepsilon = \frac{\Delta l}{l} \text{ und } \varepsilon_q = \frac{\Delta D}{D} = -\mu \cdot \varepsilon$$

Therefore:

$$\frac{\Delta R}{R} = k \cdot \frac{\Delta l}{l} = k \cdot \varepsilon$$

wherein k represents the so-called k-factor:

$$k = \frac{\Delta \rho}{\rho \cdot \varepsilon} + 1 + 2 \cdot \mu$$

The individual symbols represent the following quantities:
$\varepsilon$: relative change in length
$\varepsilon_q$: relative change in cross-section
μ: Poisson's ratio
k: k-factor Accordingly, the sensitivity to expansion is determined by the k-factor of the material used. NiCr has a k-factor of 2 and mostly individual resistances between 4 and 7 kOhm.

One drawback of the known sensor elements is the necessary wet-chemical structuring process, which requires a multitude of expensive process steps (painting, drying, exposure to light, developing the photoresist, etching the structure and removing the resist).

Structured functional layers of NiCr or TiON have k-factors typically between 2 and 5, but also have an exceptionally high long-term stability with, at the same time, a low temperature coefficient of a few ppm/K. The long-term stability of the zero drift is in this case up to 0.1% of the measuring range over 10 years, even at temperatures of up to 125° C. The deviation of the sensor sensitivity is even better by a factor of 5 to 10 relative to the zero point [see MTZ Motorentechnische Zeitschrift 07-08 (2010) Vol. 71 page 14-19]. The low current noise of −39 dB enables optimum usage in a multitude of applications (see tm— "Technisches Messen 77 (2010) 12/DOI 10.1524/teme.2010.0111).

It is known from DE 102013011157 B3 that a single functional layer can be used, which also functions as a contact layer. In particular, the use of an ultra-short pulse laser in the 30-picosecond-range (the pulse duration is $30*10^{-12}$ s) for the necessary structuring tasks of carbon-containing functional layers with a k-factor greater than 20, preferably 30, is described. One drawback, however, is the limitation of the proposed method to the piezo-resistive functional layers, which have a high k-factor, but are not yet sufficiently stable in the long term. Also, the high-voltage strength of the pressure sensor system is reduced due to the short edge distances to be chosen.

It is an object of the invention to provide a method for producing a sensor element for a pressure sensor, with which an accurate sensor element that has long-term stability and is also suitable for high-voltage application can be produced in a simpler and more cost-effective manner.

A method according to claim 1 is proposed in order to accomplish this object.

Advantageous embodiments are the subject matter of the dependent claims. A sensor element that can be obtained by means of the method and a sensor equipped with it are the subject matters of the additional independent claims.

The invention provides a method for producing a sensor element for a pressure or force sensor, comprising the steps:
a) providing a component to be deformed,
c) applying to the component a sensor function and contact layer consisting of a material with a k-factor between 2 and 10,
d) partial planar ablation of the material of the sensor function and contact layer by means of a laser, in such a manner that strain gauges with a resistance structure with a meandering shape and contact pads remain standing, wherein, for ablating the material, laser pulses from the group of laser pulses comprising:
laser pulses in the sub-ps range,
laser pulses from a broadband laser source with a wavelength bandwidth of 10 nm to 70 nm
laser pulses from a broadband laser source with a fundamental wavelength and a wavelength bandwidth of at least 1%, preferably at least 2%, most preferably at least 3% of the fundamental wavelength,
laser pulses compressed by a pulse compression process, and
laser pulses conducted through a hollow-core fiber.
are used.

Preferably, a membrane is provided as a component in step a).

Preferably, step d) is carried out in such a manner that a structure for forming a measuring bridge with several resistances with a meandering shape remains standing.

It is preferred if step d) includes:
ablation of the material in such a manner that the surface area occupied by the contact pads is equal to or smaller than the resistance structure surface area situated within an outer peripheral line around the resistance structure.

It is preferred if step d) includes:
ablation of the material in such a manner that conductive paths with a meandering shape, which form resistances of the resistance structure with a meandering shape, have a width of less than 100 μm.

It is preferred if step d) includes:
ablation of material for producing a provisional resistance of the resistance structure, measuring the electrical resistance of the provisional resistance and further ablation of material from the provisional resistance if the measured electrical resistance is lower than a target resistance, and stopping the ablation of material if the measured electrical resistance is equal to or greater than the target resistance.

It is preferred if step a) includes:
providing a metallic substrate or a steel substrate and producing the component from the metallic substrate or the steel substrate.

Preferably, a membrane is provided as a component. Alternatively, a cantilever beam or other element to be deformed under the influence of force may be provided.

A preferred embodiment of the method is characterized by the step to be carried out between step a) and step c):
b) applying an electrically insulating layer to the component,
wherein step c) includes:
applying the sensor function and contact layer to the electrically insulating layer covering the component.

It is preferred if step d) includes:
ablation of the material between the edge of the component and the material structure that remains standing and contains the resistance structure and the contact pads, in such a manner that an electrical high-voltage dielectric strength of at least 50 VAC, preferably at least 100 VAC, more particularly at least 500 to 1000 VAC is provided between the material structure that remains standing and the edge.

It is preferred if step d) includes:
use of an fs laser source with a power of 100-300 nJ, a wavelength of 480 nm to 1500 nm, in particular 800 nm, pulse widths of 5 fs to 300 fs, in particular 10 to 100 fs, more particularly 30 fs, and a bandwidth between 10 nm and 70 nm.

It is preferred if step c) includes:
applying NiCr or NiCr and Ni or TiON as a material for forming the sensor function and contact layer.

It is preferred if step d) includes:
scanning the surface to be ablated with such a speed that step d) is carried out in less than 1 second.

Further, the invention provides a sensor element that can be obtained by a method according to any one of the preceding embodiments.

Further, the invention provides a sensor for detecting pressure or force, including such a sensor element.

One drawback in the method according to DE 102013011157 B3 is, in particular, the limitation of the proposed method to the piezo-resistive functional layers, which have a high k-factor, but are not yet sufficiently stable in the long term. Also, the high-voltage strength of the sensor system is reduced due to the short edge distances to be chosen. In the case of a planar ablation, interference effects, which limit the ablation, in particular the quality thereof, if a picosecond laser source is used, have a troublesome effect—this will be explained in more detail below.

In contrast, in advantageous embodiments of the invention, a planar ablation is carried out with an fs laser source in order to produce the desired resistance layer (e.g. NiCr or TiON). In the process, powers of 100-300 nJ at a wavelength of, for example, 800 nm and pulse widths of 30 fs as well as bandwidths between 10 and 70 nm may preferably be used in order to produce the desired structurings.

In advantageous embodiments of the invention, the high-voltage strength is determined by the distance of the strain gauge structure from the metallic edge, which is typically conductively connected to the housing.

Industrial applications, such as the train sector or explosion-protected applications, in part require a dielectric strength of up to 500 . . . 1000 VAC. The method presented herein offers a freedom of design with which such dielectric strengths can be readily produced.

Preferably, NiCr or TiON can be used as a material for the functional layer. Such layers require a resistance between 4 and 8 kOhm. According to the invention, a meandering structure is produced by a planar ablation by means of a laser. Thus, NiCr, for example, provides a sheet resistivity of about 50-70 Ohm/square, polysilicon has 15-25 Ohm/square, the carbon layers described in the prior art have rather higher resistances of 150 Ohm/square.

In particularly preferred embodiments of the invention, a bridge balancing process is carried out in order to adjust the nominal bridge resistance. In particular, this can take place by means of a continuous and simultaneous measurement during laser ablation.

By using a sub-ps structuring laser, a special freedom of design in the selection of the layout can be achieved. Tests have shown that conductor paths produced with ps lasers have defects and are thus often non-conductive. Detailed experiments in this respect have shown that these defects are based on interference effects during laser ablation. If, however, laser pulses as proposed as alternatives in the invention are used, such interference effects and the accompanying defects, in particular in thin conductor paths, can be avoided.

In one embodiment, the pulse duration is only 10 . . . 100 femtoseconds ($10^{-15}$ s). Another option of avoiding the troublesome interference effects during laser structuring is the use of a more broadband beam source (e.g. 30 nm at a wavelength of 800 nm). Other options for avoiding interference effects are a pulse compression process or the use of a hollow-core fiber.

A preferred embodiment of the invention provides a sensor element, comprising a membrane and a sensor function layer, which at the same time functions as a contact layer, applied to the membrane, produced from a material with a k-factor between 2 and 10, whose strain gauge has a laser-structured layout, in particular on an insulator, preferably with pads with a size equal to or smaller than the size of the resistance structure with a meandering shape generated with a sub-ps laser in order to avoid unwanted interference effects during structuring.

Preferably, a sensor element with an optimized layout is provided, which makes a higher voltage strength possible.

Preferably, a sensor element is obtained with a total process duration of <1 second per part.

Preferably, the method is carried out with a laser structuring process, which detects the zero point and the total resistance of the bridge circuit at the same time; in the process, the zero point forms the target control quantity of the process (0 Ohm, or 1-10 kOhm for the total resistance of the bridge circuit) that runs at the same time as the actual structuring process.

An exemplary embodiment will be explained in more detail below with reference to the attached drawings. In the drawings.

Figure 1:
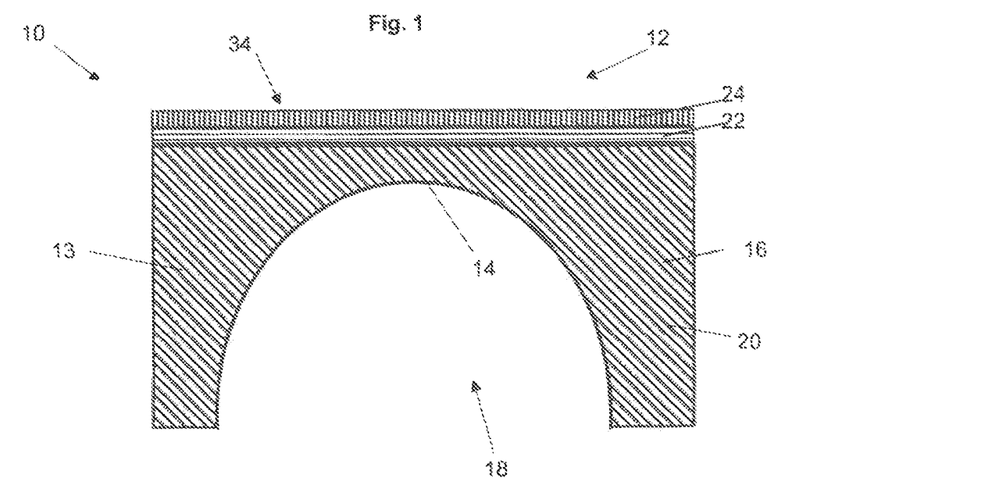
FIG. 1 shows a cross-section through a blank for a sensor element formed from a substrate with applied layers, in order to illustrate steps of a production method for the sensor element.

As shown in FIG. 1, a blank 12 is first provided for producing a sensor element 10 for an embodiment of the method of interest herein. The blank has a component 13 to be deformed, in this case a membrane 14, which is formed from a substrate 16.

In principle, all components 13 and membranes 14 to be deformed, as they are also used in the prior art mentioned in the introduction, can be used for the method of interest herein. For example, the substrate 16 is made from a high-strength steel alloy (for example DIN material 1.452 or Inconel). For example, the membrane 14 is produced in such a way that material is ablated from one side of a solid body in order thus to obtain a blind opening 18 that is sealed on the other end of the opening by the membrane 14, wherein the blind opening 18 is surrounded by a ring wall 20. In other examples, cantilever beams (not shown) are provided as components (13) for force sensors. For example, a plurality of cantilever beams can be jointly processed on a wafer in a single step.

In the example of a membrane 14 presented in the Figures, an insulation layer 22 consisting of an electrically insulating material (e.g. $SiO_2$) is applied by common processes, such as PVD or CVD, to the side of the membrane 14 opposite from the blind opening 18.

A sensor function and contact layer 24 is applied to the insulation layer 22, also by means of the aforementioned processes. A material with a k-factor between 2 and 10 is used for this purpose. NiCr or TiON are examples for such materials.

Figure 2:
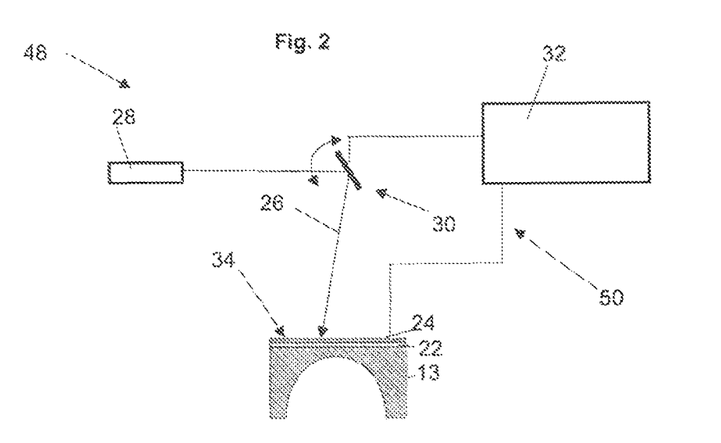
FIG. 2 shows an assembly for laser-structuring the blank from FIG. 1, for ablating material at the uppermost layer in a planar manner, in order thus to obtain a layout for a measuring bridge.

Reference is made below to FIG. 2.

The blank 10 is now processed by laser structuring, see FIG. 2.

For this purpose, a pulsed laser beam 26 from a laser source 28 is moved across the top surface of the membrane 14 by means of sufficiently well-known scanning devices 30, controlled by means of a control system 32, in such a way that the material of the sensor function and contact layer 24 is ablated in a planar manner in selected areas, wherein the material remains standing in other areas in order thus to produce from the sensor function and contact layer 24 a sensor function and contact structure 36 in accordance with a predefined target layout.

Figure 3:
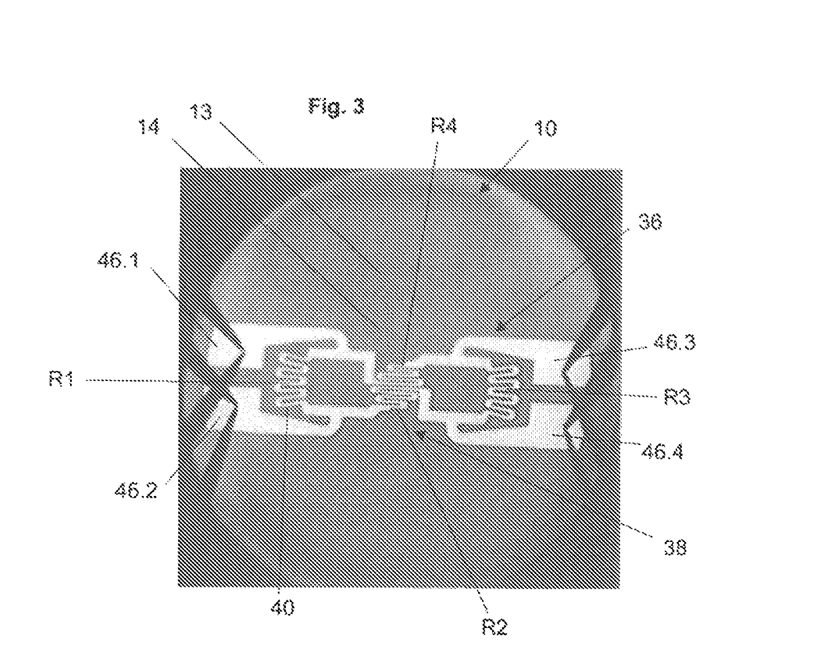
FIG. 3 shows a photograph of a target layout to be produced, for example, by laser structuring.

An example for the target layout of the sensor function and contact structure 36 is presented in FIG. 3.

In particular, a measuring bridge 38 with four resistances R1, R2, R3, R4 is produced. Each resistance R1-R4 is formed by conductor paths 40 from the material of the sensor function and contact layer 24, wherein the conductor paths 40 in the area of the resistances R1-R4 have a meandering shape 42. A part of the resistances R2, R4 serves as a strain gauge 44 for detecting a deformation of the component 13, for example that of the membrane 14.

Further, the sensor function and contact structure 36 has first to fourth contact pads 46.1, 46.2, 46.3, 46.4.

At a given thickness, the electrical resistance of the resistances R1-R4 is determined, in particular, by the width of the conductor path 40 that were left standing.

Figure 4:
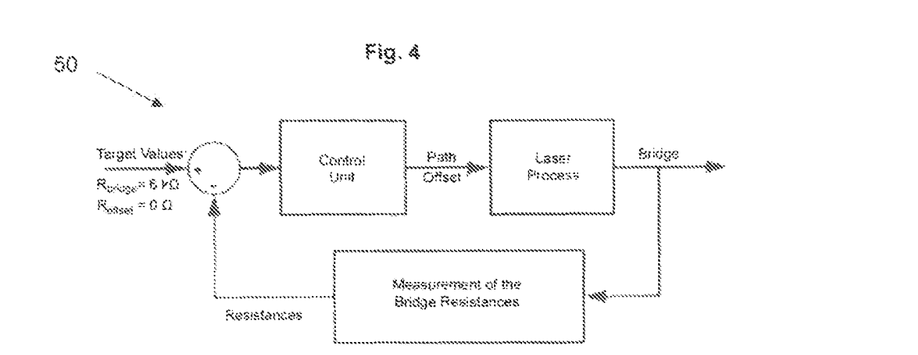
FIG. 4 is a block diagram for a controlled measuring system for producing the desired structure of FIG. 3 with the assembly of FIG. 2, without a separate adjusting step.

FIG. 4 presents an electronic measuring system 50 with which the material ablation by the laser structuring assembly 48 shown in FIG. 4 is controlled in such a way that resistances R1, R2, R3, R4 with a desired electrical resistance are produced.

This is based on, as target values, the resistance of the measuring bridge 38 $R_{bridge}$ (e.g. 6 kOhm) and as low an offset resistance as possible $R_{offset}$=0 Ohm. Now, a broader conductor path 40 is first produced as a provisional resistance by laser structuring, and then, or simultaneously, the bridge resistance $R_{bridge}$ is measured. If the target values are not yet obtained in this way, more material is ablated.

Figure 5:
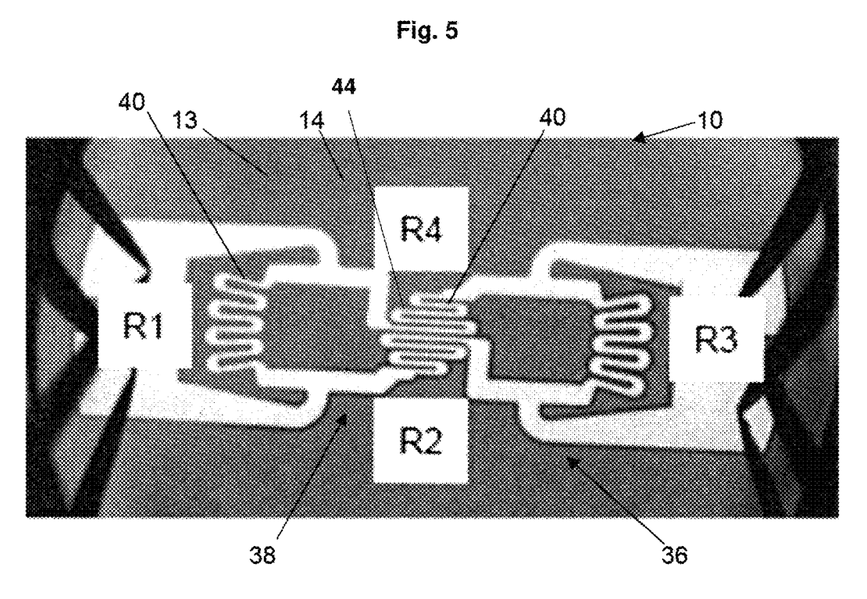
FIG. 5 shows the target layout of FIG. 3 with the designation of the resistances.
Figure 6:
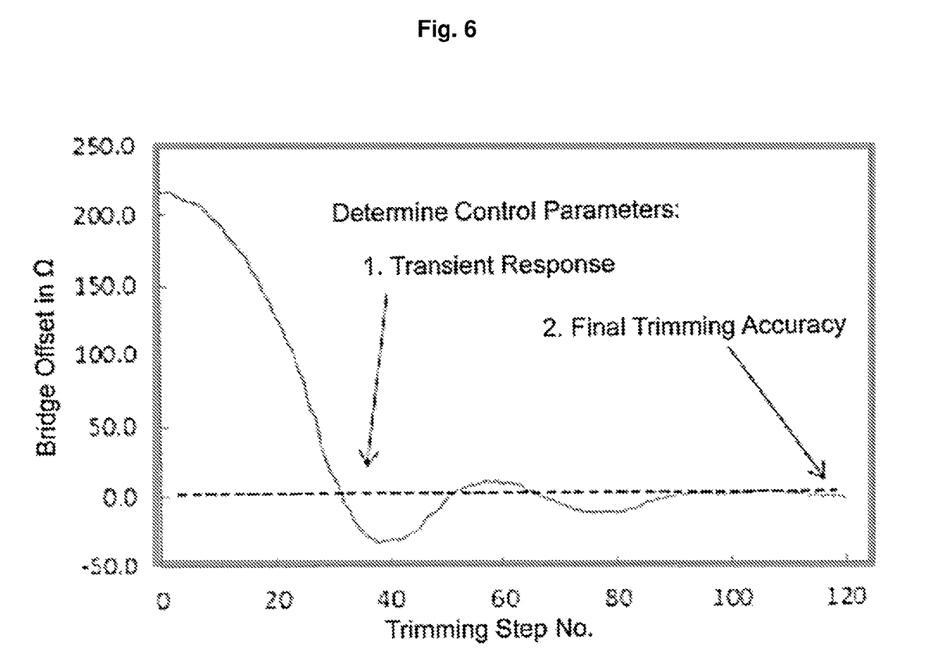
FIG. 6 shows a graph for determining the control parameters for the measuring system of FIG. 4.

FIG. 5 shows the designation of the individual resistances R1-R4; in FIG. 6, the definition of the control parameters is illustrated in a graph.

A pulsed laser source is used as a laser source 28.

Figure 7:
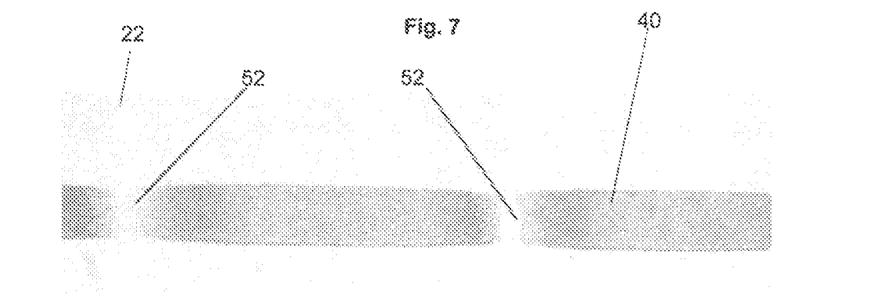
FIG. 7 shows a conductor path with defects due to interference effects, obtained by laser ablation.

FIG. 7 shows a problem that was discovered during the production of conductor paths 40 by means of laser ablation with pulsed laser sources 28.

Figure 8:
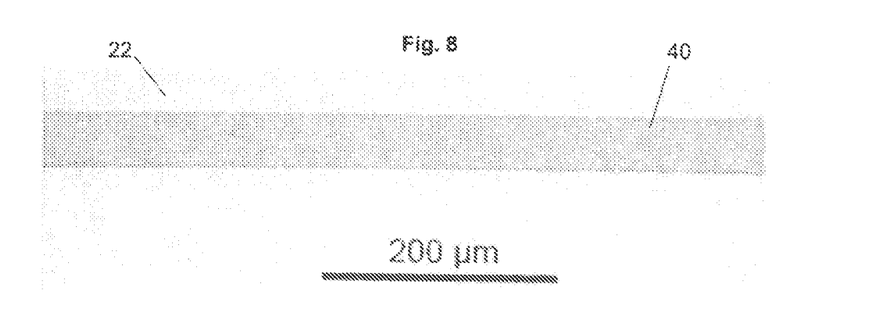
FIG. 8 shows a conductor path without defects (desired result), obtained by laser ablation.
Figure 9:
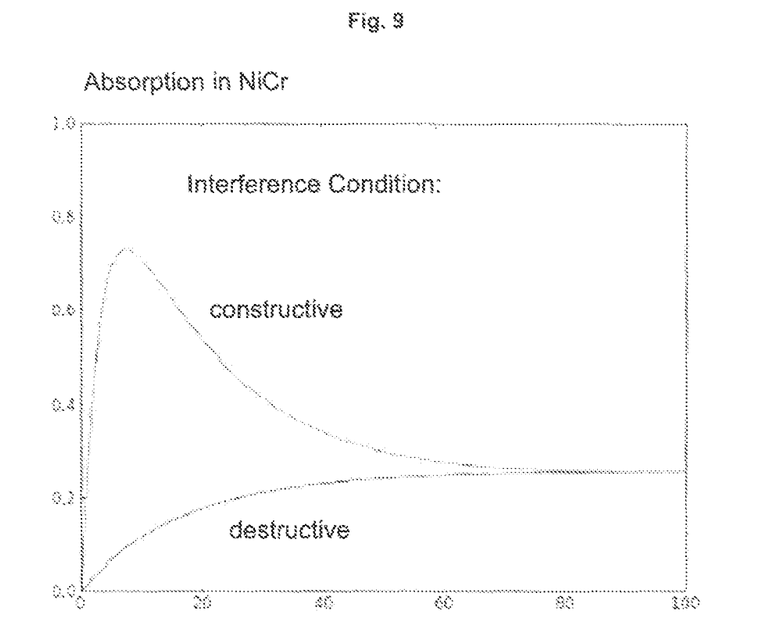
FIG. 9 shows a graph for illustrating the interference effect that may result in the defects in the structure as shown in FIG. 7.

The conductor path 40 according to FIG. 7, which corresponds to the ideal conductor path 40 of FIG. 8 with respect to its size, has been produced with a laser source 28 with a pulse duration in the picosecond range with a very small bandwidth at a wavelength of 1030 nm. As indicated in FIG. 9, in connection with an absorption of the laser radiation 26 in the sensor function and contact layer 24, there are conditions, depending on the thickness layer, under which destructive interferences may occur. Strips 52, where the conductor paths 40 are interrupted, are produced by destructive interference.

If, however, the pulse duration is reduced and/or the bandwidth increased, these interference conditions can be avoided, as is indicated in FIG. 8. This conductor path 40 of FIG. 8 has been produced with a pulse duration of 30 to 50 fs and a bandwidth of 55 nm at a wavelength of 800 nm by planar ablation of the adjacent material.

Figure 10:
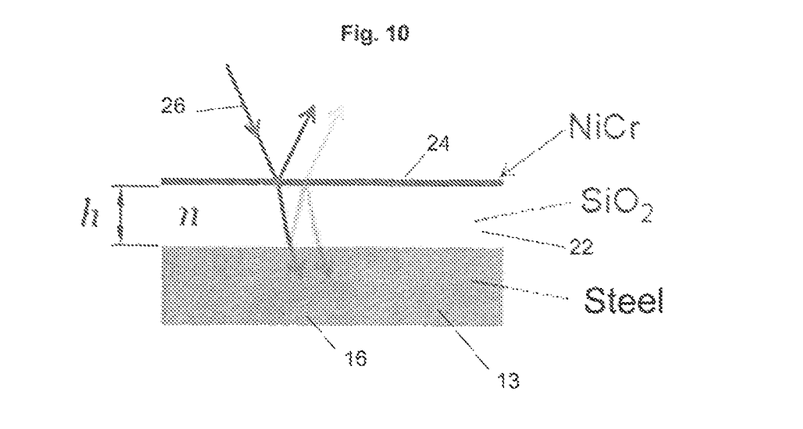
FIG. 10 shows a depiction for illustrating how the interference effect can be avoided.

The conditions under which destructive interference can be avoided are explained in more detail below with reference to the illustration in FIG. 10. It shows the substrate 16, for example steel, the insulation layer 22, for example $SiO_2$, and the sensor function and contact layer 24 together with the incident laser beam 26.

Interference can be avoided by means of a short pulse duration.

In this case, the pulse length in space should be shorter than the distance covered in the insulation layer 22.

Accordingly, the following applies for the pulse duration $$\tau_p \leq \frac{2hm}{c_0}$$

wherein
$\tau_p$ the pulse duration
h the layer thickness of the insulator layer
$c_0$ the speed of light in vacuum
n the refractive index.

If, for example h=6 µm, n≈1.45 ($SiO_2$), then $$\tau_p \leq \frac{2 \cdot 6 \cdot 10^{-6} \text{ m} \cdot 1.45}{3 \cdot 10^8 \text{ m/s}} = 58 \text{ fs}.$$

Depending on the layer thickness, destructive interference effects can be avoided with laser pulses in the sub-picosecond range.

Another way of avoiding the interference effects is the use of a more broadband laser source. Alternatively or additionally, a pulse compression process may be carried out, or a hollow-core fiber can be used for conducting the laser beam 26.

Accordingly, the material of the sensor function and contact layer 24 is ablated in such a planar manner that only the sensor function and contact structure 36 with the target layout structure shown in FIGS. 3 and 5 remains standing. In this case, enough room is left towards the edge of the component 13, e.g. the membrane 14, so that a desired dielectric strength is provided with respect to the mostly metallic bordering.

For this purpose, the contact pads 46.1-46.4, in particular, are configured with a correspondingly small size. Their size corresponds at most to the surface area covered in total by the resistances R1-R4.

LIST OF REFERENCE NUMERALS

10 Sensor element
12 Blank
13 Component
14 Membrane
16 Substrate
18 Blind opening
20 Ring wall
22 Insulation layer
24 Sensor function and contact layer
26 Laser beam
28 Laser source
30 Scanning device
32 Control system
34 Top surface
36 Sensor function and contact structure
38 Measuring bridge
40 Conductor path
42 Meandering shape
44 Strain gauge
46.1 First contact pad
46.2 Second contact pad
46.3 Third contact pad
46.4 Fourth contact pad
48 Laser structuring assembly
50 Electronic measuring system
52 Strip with break
R1 First resistance
R2 Second resistance
R3 Third resistance
R4 Fourth resistance

The invention claimed is:

1. A method for producing a sensor element (10) for a pressure or force sensor, comprising:
   a) providing a component (13) to be deformed;
   b) applying to the component (13) a sensor function and contact layer (24) consisting of a material with a k-factor between 2 and 10; and
   c) planar ablation of the material of the sensor function and contact layer (24) by means of a laser, in such a manner that strain gauges (44) with a resistance structure with a meandering shape and contact pads (46.1, 46.2, 46.3, 46.4) remain standing,
wherein for ablating the material, laser pulses selected from a group consisting of laser pulses in the sub-picosecond range, laser pulses from a broadband laser source (28) with a wavelength bandwidth of 10 nm to 70 nm, laser pulses from a broadband laser source (28) with a fundamental wavelength and a wavelength bandwidth that is greater than or equal to 1% of the fundamental wavelength, laser pulses compressed by a pulse compression process, and laser pulses conducted through a hollow-core fiber are used.

2. The method according to claim 1, wherein the step c) includes:
ablation of the material in such a manner that the surface area occupied by the contact pads (46.1, 46.2, 46.3, 46.4) is equal to or smaller than the resistance structure surface area situated within an outer peripheral line around the resistance structure.

3. The method according to claim 1 or 2, wherein the step c) includes:
ablation of the material in such a manner that conductive paths (40) with a meandering shape, which form resistances (R1-R4) of the resistance structure with a meandering shape, have a width of less than 100 μm.

4. The method according to claim 1, wherein the step c) includes:
ablation of material for producing a provisional resistance of the resistance structure, measuring the electrical resistance of the provisional resistance and further ablation of material from the provisional resistance when the measured electrical resistance is lower than a target resistance, and stopping the ablation of material when the measured electrical resistance is equal to or greater than the target resistance.

5. The method according to claim 1, wherein the step a) includes:
providing a metallic substrate (16) or a steel substrate and producing the component (13) from the metallic substrate (16) or the steel substrate.

6. The method according to claim 1, further including, between the step a) and the step b):
applying an electrically insulating insulation layer (22) to the component (13),
wherein the step b) includes:
applying the sensor function and contact layer (24) to the electrically insulating insulation layer (22) covering the component (13).

7. The method according to claim 6, wherein the step c) includes:
use of laser pulses with a pulse length $\tau_p$, wherein $$\tau_p \le \frac{2hn}{c_0}$$

wherein
$\tau_p$ is a pulse duration,
h is a layer thickness of the insulator layer,
$c_0$ is a speed of light in vacuum, and
n is a refractive index.

8. The method according to claim 1, wherein the step c) includes:
ablation of the material between the edge of the component (13) and the material structure that remains standing and contains the resistance structure and the contact pads (46.1, 46.2, 46.3, 46.4), in such a manner that an electrical high-voltage dielectric strength that is greater than or equal to 50 VAC is provided between the material structure that remains standing and the edge.

9. The method according to claim 1, wherein the step c) includes:
use of an femtosecond (fs) laser source (28) with a power of 100-300 nJ, a wavelength of 480 nm to 1500 nm, pulse widths of 5 fs to 300 fs, and a bandwidth between 10 nm and 70 nm.

10. The method according to claim 1, wherein the step b) includes:
applying NiCr or NiCr and Ni or TiON as a material for forming the sensor function and contact layer (24), respectively.

11. The method according to claim 1, wherein the step c) includes:
scanning the surface to be ablated with such a speed that step c) is carried out in less than 1 second.

12. The method according to claim 1, wherein the step a) includes:
providing a membrane (14) as a component (13).

13. A sensor element (10) obtained by a method according to claim 1.

14. A sensor for measuring pressure or force, comprising a sensor element (10) according to claim 13.

* * * * *